UNITED STATES PATENT OFFICE.

FRANKLIN BAKER, JR., OF PHILADELPHIA, PENNSYLVANIA.

PROCESS OF PREPARING OR TREATING COCOANUT AND PRODUCT OBTAINED THEREBY.

1,348,689.   Specification of Letters Patent.   Patented Aug. 3, 1920.

No Drawing.   Application filed October 14, 1918.   Serial No. 257,995.

*To all whom it may concern:*

Be it known that I, Franklin Baker, Jr., a citizen of the United States, residing in Philadelphia, Pennsylvania, have invented Processes of Preparing or Treating Cocoanut and Product Obtained Thereby, of which the following is a specification.

My invention relates to the preparation, preservation and packing of fresh cocoanut, that is to say the meat or kernel of the fruit, with the original milk, whereby it will keep in a fresh state for a relatively indefinite length of time.

In my prior patents dated June 19, 1917, I have set forth several processes of treating cocoanut, in which I have described in one instance the use of the milk; in another instance the use of sugar, and in another instance a special heat treatment. The essential requisite in the treatment of cocoanut in my present process as well as in my patented processes, is a question of temperature, and in carrying out my several processes the heat applied may range from 212° F. to a temperature as high as 250° F.

The essential object of my present invention is to provide a preserved cocoanut product with nothing added; such preserved product having the original moisture, dampness and condition of fresh grated or shredded cocoanut; the milk originally with the cocoanut being preserved with the shredded or grated mass of the kernel, and the whole packed in cans, glasses or any other suitable form of receptacles which are hermetically sealed.

In carrying my present process into effect, the cocoanuts are opened in any suitable manner and the milk carefully drained from the same and saved; the kernel or meat of the cocoanut being then cut up, shredded, or grated by any approved or well known means, and then the shredded or grated cocoanut is placed in the cans or other receptacles in which it is to be packed for sale and subsequent use.

In the meanwhile, the milk of the cocoanuts thus prepared has been heated, being raised to a temperature substantially, but not exceeding, that of the boiling point of water, and after the cans have been substantially filled with the shredded or grated cocoanut, a portion of this milk, the amount used being directly proportionate to the amount of cocoanut in the cans, may be poured into the latter.

For the purpose of effecting a complete sterilization of the cocoanut so prepared, it is necessary to subject the same to temperatures relatively high in order that any bacteria present may be killed and a completely sterilized product produced that will keep in a sweet condition for a relatively long period of time.

In carrying my present invention into effect after the cocoanut product together with a portion of the milk has been packed in the final receptacle, it is subjected to a temperature of approximately 212° F., *in pleno;* the lids or covers of the receptacles being off, and this heating may take place in a steam chamber in which the steam is free to circulate around the cans, and may continue for a period of ten minutes or longer, depending upon various factors, such as the size of the pieces or shreds of cocoanut; the bulk which each can or other receptacle receives, or conditions which might be present in the operating room. In some instances, the heat may be raised to a higher temperature if necessary or desirable; say to 225° F., and for a very brief period of time to a much higher temperature.

At the completion of this steaming treatment, the cans or other receptacles filled with the cocoanut and the heated milk are introduced into a vacuum chamber in which they receive their lids or covers; means being employed to insure a substantially complete extraction of air from the cans prior to the final and complete application of the lids or covers so that the goods are not only packed *in vacuo*, but an actual vacuum exists within the can or other receptacle. By these means I am enabled to prevent discoloration of the product which might be due to an oxidizing effect and, in addition, the absence of air will necessarily enhance the sterilization and keeping qualities of the product.

After the lids or covers have been secured to the cans or other receptacles, they are subjected to a sterilizing temperature which may range from 215° F. to 225° F.; the critical temperature being about 220° F. The cans or other receptacles with the contained cocoanut and heated milk are maintained at the desired temperature until the cocoanut has been thoroughly heated through and the bacteria thereof destroyed. The usual period of time for this heat treatment is approximately one-half hour, although in some instances it may be desirable or necessary to raise the temperature in the steam pressure chamber to a much higher point, approximately to 250° F., for a short period of time, and this may be necessary when treating some kinds of cocoanut in which the bacteria present can only be destroyed at the higher heat. This higher temperature is maintained for approximately five minutes. The cans or other receptacles are then withdrawn and allowed to cool at room temperature, or they may be suddenly cooled by being plunged into a suitable cooling fluid immediately upon leaving the final heating chamber. To this end they may be plunged into a body of cold water, or carried through a cooling chamber, or otherwise treated to attain the desired result. After this the product is ready for market and subsequent use.

In heating the cocoanut and the contained milk within the open receptacles in which it is packed, (and which are finally hermetically closed in the vacuum chamber) the temperature may range from 212° F. to 225° F.; the latter temperature being secured by introducing the receptacles into a suitable chamber wherein the heat is applied under pressure.

Reference in the claims to the step of cutting, grating, shredding, or comminuting the cocoanut kernel is not to be construed as limiting my invention to any exact manner of preparing the kernel; such language being intended to include any method or means of cutting up or dividing the kernel, in fine or coarse pieces, or both, to make it readily available in carrying out my improved process and for subsequent use as an article of food.

I claim:

1. The process of preserving cocoanut in a natural moist condition with the original milk, which comprises separating the milk from the kernel, finely dividing the kernel, packing the same in receptacles, heating the milk of the cocoanut to a temperature approximating 212° F., introducing a portion of the heated cocoanut milk into the finely divided mass of the kernel, heating the open receptacles *in pleno* to a temperature of approximately 212° F. to 225° F., introducing the heated receptacles into a vacuum chamber whereby the air may be extracted therefrom, hermetically closing the receptacles in which the finely divided cocoanut and milk are placed *in vacuo*, subjecting the filled and sealed receptacles to a temperature sufficient to completely sterilize the contents thereof, and suddenly cooling the receptacles and their contents by introducing them into a cooling fluid immediately upon leaving the final heating chamber.

2. As a new article of manufacture, a hermetically sealed completely sterilized package of cocoanut kernel in a finely divided state together with its original milk and free from air.

3. As a new article of manufacture, a hermetically sealed completely sterilized package of cocoanut kernel in a finely divided state together with its original milk confined *in vacuo* and free from air.

FRANKLIN BAKER, Jr.